(No Model.)
C. L. COFFIN.
PROCESS OF WELDING METALS ELECTRICALLY.
No. 463,486. Patented Nov. 17, 1891.
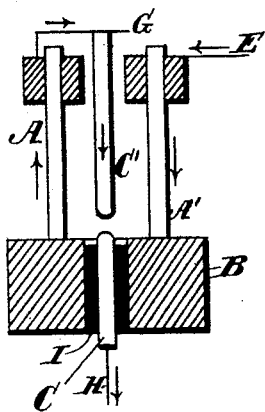
Witnesses.
Robert Everett
A. H. Norris
Inventor,
Charles L. Coffin
By Geo. H. Lothrop.
Atty.

UNITED STATES PATENT OFFICE.

CHARLES L. COFFIN, OF DETROIT, MICHIGAN.

PROCESS OF WELDING METALS ELECTRICALLY.

SPECIFICATION forming part of Letters Patent No. 463,486, dated November 17, 1891.

Application filed June 9, 1890. Serial No. 354,731. (No model.)

*To all whom it may concern:*

Be it known that I, CHARLES L. COFFIN, of Detroit, in the county of Wayne and State of Michigan, have invented a new and useful Improvement in Processes of Welding or Working Metals Electrically, of which the following is a specification.

This invention is designed as an improvement on Letters Patent No. 399,019, issued to me March 4, 1889; and it consists in the process of welding metals electrically by first separately subjecting the articles to be welded to the action of a heating-current and the voltaic arc and then pressing the heated articles together to form the weld.

In the drawing the figure is a diagram illustrating one means for carrying my process into effect.

In order to enable those skilled in the art to make and practice my invention, I will now describe the same in detail, referring to the drawing, wherein—

The letters A A' indicate two metal rods, the ends of which are to be heated for welding or other purposes, and C indicates the lower carbon supported by a block B, but insulated therefrom by insulating material I. The ends of the rods or articles A A' rest in contact with the block B, which latter is a conducting material. A conductor E is adapted to connect the rod A' with one pole of a generator, and a conductor H is adapted to connect the lower carbon C with the other pole of the generator, while a conductor G connects the upper carbon C' with the rod A. In this arrangement the current is through the conductor E, rod or article A', block B, rod or article A, conductor G, carbons C' C, and conductor H, back to the generator, as indicated by the arrows. On passing an electric current through the circuit the ends of the articles A A' are separately and simultaneously subjected to the heating effect of the current and also to the heat of a voltaic arc. When by these means they have been sufficiently heated, they are pressed together to form a weld.

What I claim is—

The herein-described process of welding metals electrically, which consists in first separately subjecting the articles to be welded to the action of a heating-current and the voltaic arc and then pressing the heated articles together to form the weld, substantially as set forth.

CHARLES L. COFFIN.

Witnesses:
CYRUS E. LOTHROP,
GERTRUDE H. ANDERSON.